(No Model.)

G. B. HARRIS.
POST AUGER.

No. 413,343. Patented Oct. 22, 1889.

Witnesses.
A. Ruppert.
G. B. Towles.

Inventor.
Green B. Harris,
Per
Thomas P. Simpson
Atty

UNITED STATES PATENT OFFICE.

GREEN BERRY HARRIS, OF MOORESVILLE, TEXAS.

POST-AUGER.

SPECIFICATION forming part of Letters Patent No. 413,343, dated October 22, 1889.

Application filed May 28, 1889. Serial No. 312,362. (No model.)

*To all whom it may concern:*

Be it known that I, GREEN BERRY HARRIS, a citizen of the United States, residing at Mooresville, in the county of Falls and State of Texas, have invented certain new and useful Improvements in Post-Augers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to improve that class of post-augers whose blades are made adjustable so as to make large or small holes. They have ordinarily been adjusted by means of a bolt, nut, and slot in the blade; but the blades work out of correspondence with each other, the nuts becoming more or less loosened. I dispense with bolt, nut, and slot, and employ the means hereinafter described and claimed.

Figure 1:
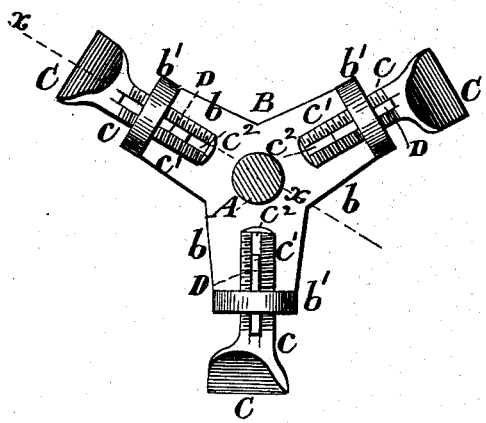
Figure 3:
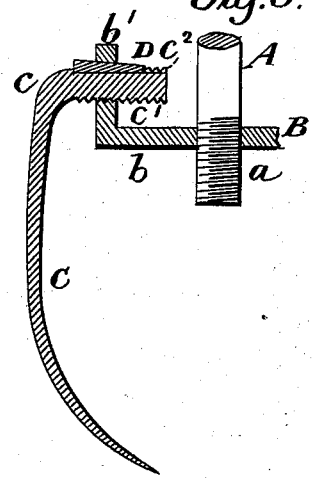
Figure 2:
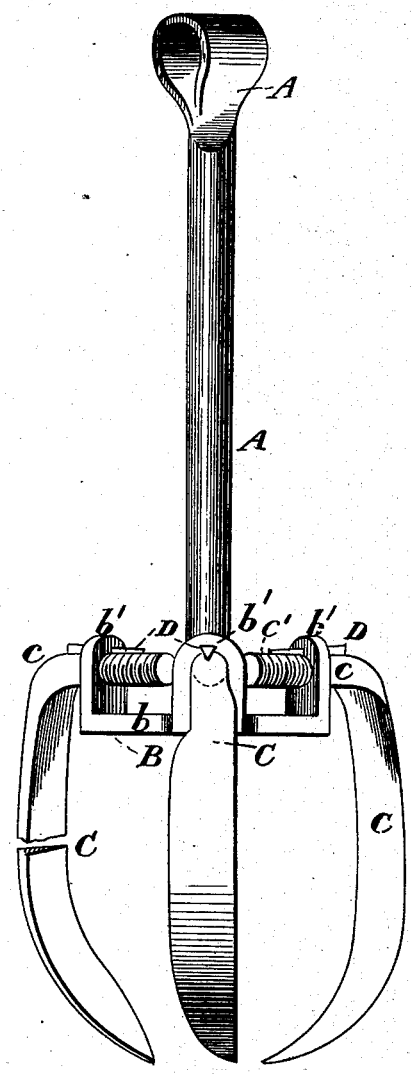

Figure 1 of the drawings is a plan view; Fig. 2, an elevation in perspective, and Fig. 3 a vertical section on the dotted line $x\ x$ of Fig. 1.

In the drawings, A represents the handle, and B the spider, which carries the auger-blades, and has a centrally-threaded aperture to receive the screw $a$ on the end of the handle. The spider-arms $b$ each have an upturned flange $b'$, which are bored and threaded to receive the screws $c'$ on the arms $c$ of the blades C. The screws $c'$ are each provided with a groove $c^2$, which is cut in a straight line across the thread. In this groove works a small removable wedge D, which serves to hold the screw at any desired point of adjustment, so as to make a hole of any suitable diameter.

In practice with my particular means of adjustment the blades remain rigidly in place after they have been set and cut with perfect uniformity. Being held in exact correspondence during each cut, the labor of cutting the post-holes is greatly lessened, while the work is done in a more even satisfactory manner.

Having thus described all that is necessary to a full understanding of my invention, what I claim as new, and desire to protect by Letters Patent, is—

A post-auger spider or blade-holder provided with a bored, threaded, and upturned flange $b'$ on each of its arms, in combination with blades C, having on the ends of their arms $c$ screws $c'$, a groove $c^2$ across each thread, and detachable wedges D, working in said grooves, as and for the purpose set forth.

In testimony whereof I affix my signature in presence of two witnesses.

GREEN BERRY HARRIS.

Witnesses:
T. R. COX,
GEO. W. LOONE.